(12) United States Patent
Farrell

(10) Patent No.: US 12,147,540 B2
(45) Date of Patent: Nov. 19, 2024

(54) SYSTEM AND METHOD TO IMPLEMENT A SECURE BOOT EVENT WITH ONE OF A PLURALITY OF CANDIDATE PUBLIC KEY INFRASTRUCTURE AUTHENTICATION KEY SETS

(71) Applicant: GM GLOBAL TECHNOLOGY OPERATIONS LLC, Detroit, MI (US)

(72) Inventor: Brian Farrell, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 17/975,695

(22) Filed: Oct. 28, 2022

(65) Prior Publication Data
US 2024/0143772 A1    May 2, 2024

(51) Int. Cl.
G06F 21/57 (2013.01)
G06F 9/4401 (2018.01)
H04L 9/30 (2006.01)
H04L 9/32 (2006.01)

(52) U.S. Cl.
CPC .......... *G06F 21/575* (2013.01); *G06F 9/4401* (2013.01); *G06F 21/572* (2013.01); *H04L 9/30* (2013.01); *H04L 9/3242* (2013.01); *G06F 2221/034* (2013.01)

(58) Field of Classification Search
CPC .... G06F 9/4401; G06F 21/575; G06F 21/572; H04L 9/30; H04L 9/3242
USPC .......................................................... 713/2
See application file for complete search history.

(56) References Cited

U.S. PATENT DOCUMENTS

| | | | | |
|---|---|---|---|---|
| 8,856,538 B2* | 10/2014 | Costin | ............. | G06F 21/572 |
| | | | | 713/168 |
| 10,339,317 B2* | 7/2019 | Raghuram | ............. | G06F 21/71 |
| 11,068,598 B2* | 7/2021 | Brown | ............. | G06F 21/445 |
| 2020/0210586 A1* | 7/2020 | Cariello | ............. | G11C 16/26 |
| 2021/0357537 A1* | 11/2021 | Alon | ............. | G06F 21/577 |

OTHER PUBLICATIONS

"Secure Boot, Chain of Trust and Data Protection", by Akshay Bhat, from Embedded World 2019 Conference, Dated Feb. 27, 2019. (Year: 2019).*

* cited by examiner

*Primary Examiner* — Brian T Misiura
(74) *Attorney, Agent, or Firm* — Quinn IP Law

(57) ABSTRACT

A system for implementing a secure boot event includes a system on a chip (SoC). The SoC includes key hashes stored within one-time programmable memory. Each of the key hashes is configured for use with one of a plurality of candidate authentication key sets. The SoC further includes firmware stored within RAM. The firmware includes a secondary bootloader, a plurality of public keys, and corresponding signatures. The public keys and corresponding signatures are configured for use with one of the key sets. The SoC further includes a primary bootloader utilizing fuses stored within the programmable memory. The fuses activate a selected key hash based upon an ecosystem in which the system is to operate. The selected hash and a corresponding public key and signature define an active authentication key set. During the event, the primary bootloader utilizes the active authentication key set to authenticate a downloaded update to the firmware.

16 Claims, 5 Drawing Sheets

SYSTEM AND METHOD TO IMPLEMENT A SECURE BOOT EVENT WITH ONE OF A PLURALITY OF CANDIDATE PUBLIC KEY INFRASTRUCTURE AUTHENTICATION KEY SETS

INTRODUCTION

The disclosure generally relates to a system and method to implement a secure boot event with one of a plurality of candidate public key infrastructure (PKI) authentication key sets.

A system on a chip (SoC) may be an integrated circuit configured to operate as a computerized unit. A computerized control system may include a plurality of SoCs serving a plurality of functions.

A device including one-time programmable memory may store and execute a primary bootloader which, upon a reset event or power on event, may be utilized to perform certain tasks to initiate operation of the computerized control system. The one-time programmable memory may include read-only memory (ROM) and programmable electronic fuses. The primary bootloader may enable loading of an operating system within memory of the computerized control system. The device including the one-time programmable memory may be an SoC. PKI describes a system used to enable the use of digital signatures to verify the authenticity of data (e.g., firmware images).

SUMMARY

A system for implementing a secure boot event is provided. The system includes a circuit board. The circuit board includes a system on a chip (SoC). The SoC includes one-time programmable memory configured for storing computerized programming and a plurality of public key hashes stored within the one-time programmable memory. Each of the plurality of public key hashes is configured for use with one of a plurality of candidate firmware image authentication key sets. The SoC further includes random-access memory (RAM) configured for storing a firmware image and the firmware image configured for being executed by the SoC and stored within the RAM. The firmware image includes a secondary bootloader and a plurality of public keys. Each of the plurality of public keys is configured for use with one of the plurality of candidate firmware image authentication key sets. The firmware image further includes a plurality of signatures. Each of the plurality of signatures is configured for use with one of the plurality of candidate firmware image authentication key sets. The SoC further includes a primary bootloader stored within the one-time programmable memory. The primary bootloader within the SoC memory uses a plurality of fuses configured for selectively activating a selected public key hash from the plurality of public key hashes. The selected public key hash is selected based upon an ecosystem in which the system is to operate. The selected public key hash is utilized to select an active public key from the plurality of public keys. The selected public key hash is utilized to select an active signature from the plurality of signatures. The selected public key hash, the active public key, and the active signature define an active firmware image authentication key set from the plurality of candidate firmware image authentication key sets. The SoC is configured for executing an update to the firmware image through an external flash. During the secure boot event, the primary bootloader utilizes the active firmware image authentication key set to authenticate the firmware image.

In some embodiments, the ecosystem in which the system is to operate includes a geographic region in which the system is to operate.

In some embodiments, the ecosystem in which the system is to operate includes a company to which the system is being sold.

In some embodiments, one of the public key hashes is selected as an initially active public key hash. During an initial secure boot event, the initially active public key hash and a corresponding one of the plurality of public keys are used to establish a default root of trust between the primary bootloader and the secondary bootloader.

In some embodiments, after the selected public key hash is selected from the plurality of public key hashes, a remainder of the plurality of public key hashes are revoked.

In some embodiments, the firmware image further includes a signature table including a second plurality of signatures, wherein the second plurality of signatures is configured for authenticating one of a hypervisor module, an operating system bootloader module, or an operating system kernel module.

According to one alternative embodiment, a system for implementing a secure boot event is provided. The system includes a device including a circuit board. The circuit board includes a system on a chip (SoC). The SoC includes one-time programmable memory configured for storing computerized programming and a plurality of public key hashes stored within the one-time programmable memory. Each of the plurality of public key hashes is configured for use with one of a plurality of candidate firmware image authentication key sets. The SoC further includes random-access memory (RAM) configured for storing a firmware image and the firmware image configured for being executed by the SoC and stored within the RAM. The firmware image includes a secondary bootloader and a plurality of public keys. Each of the plurality of public keys is configured for use with one of the plurality of candidate firmware image authentication key sets. The firmware further includes a plurality of signatures. Each of the plurality of signatures is configured for use with one of the plurality of candidate firmware image authentication key sets. The SoC further includes a primary bootloader stored within the one-time programmable memory. The primary bootloader within the SoC memory uses a plurality of fuses configured for selectively activating a selected public key hash from the plurality of public key hashes. The selected public key hash is selected based upon an ecosystem in which the system is to operate. The selected public key hash is utilized to select an active public key from the plurality of public keys. The selected public key hash is utilized to select an active signature from the plurality of signatures. The selected public key hash, the active public key, and the active signature define an active firmware image authentication key set from the plurality of candidate firmware image authentication key sets. The SoC is configured for executing an update to the firmware image through an external flash. During the secure boot event, the primary bootloader utilizes the active firmware image authentication key set to authenticate the firmware image.

In some embodiments, the device includes a vehicle.

In some embodiments, the ecosystem in which the system is to operate includes a geographic region in which the system is to operate.

In some embodiments, the ecosystem in which the system is to operate includes a company to which the system is being sold.

In some embodiments, one of the public key hashes is selected as an initially active public key hash. During an initial secure boot event, the initially active public key hash and a corresponding one of the plurality of public keys are used to establish a default root of trust between the primary bootloader and the secondary bootloader.

In some embodiments, after the selected public key hash is selected from the plurality of public key hashes, a remainder of the plurality of public key hashes are revoked.

In some embodiments, the firmware image further includes a signature table including a second plurality of signatures, wherein the second plurality of signatures is configured for authenticating one of a hypervisor module, an operating system bootloader module, or an operating system kernel module.

According to one alternative embodiment, a method for implementing a secure boot event is provided. The method includes, within one-time programmable memory of a system on a chip (SoC), storing a plurality of public key hashes within the one-time programmable memory. Each of the plurality of public key hashes is configured for use with one of a plurality of candidate firmware image authentication key sets. The method further includes, within random-access memory (RAM) of the SoC, storing a firmware image. The firmware image is configured for being executed by the SoC and includes a secondary bootloader and a plurality of public keys. Each of the plurality of public keys is configured for use with one of the plurality of candidate firmware image authentication key sets. The firmware image further includes a plurality of signatures. Each of the plurality of signatures is configured for use with one of the plurality of candidate firmware image authentication key sets. The method further includes, within the one-time programmable memory, additionally storing a primary bootloader including a plurality of fuses configured for selectively activating a selected public key hash from the plurality of public key hashes. The method further includes activating the selected public key hash based upon an ecosystem in which the system is to operate. The method further includes utilizing the selected public key hash to select an active public key from the plurality of public keys and utilizing the selected public key hash to select an active signature from the plurality of signatures. The method further includes defining an active firmware image authentication key set from the plurality of candidate firmware image authentication key sets based upon the selected public key hash, the active public key, and the active signature define. The method further includes executing an update to the firmware image through an external flash and, during the secure boot event, operating the primary bootloader to utilize the active firmware image authentication key set to authenticate the firmware image.

In some embodiments, the ecosystem in which the system is to operate includes a geographic region in which the system is to operate.

In some embodiments, the ecosystem in which the system is to operate includes a company to which the system is being sold.

In some embodiments, the method further includes selecting one of the plurality of public key hashes as an initially active public key hash. The method further includes, during an initial secure boot event, utilizing the initially active public key hash and a corresponding one of the plurality of public keys to establish a default root of trust between the primary bootloader and the secondary bootloader.

In some embodiments, the method further includes, after the selected public key hash is selected from the plurality of public key hashes, revoking a remainder of the plurality of public key hashes.

In some embodiments, the firmware image further includes a signature table including a second plurality of signatures. The method further includes utilizing the second plurality of signatures to authenticate one of a hypervisor module, an operating system bootloader module, or an operating system kernel module.

The above features and advantages and other features and advantages of the present disclosure are readily apparent from the following detailed description of the best modes for carrying out the disclosure when taken in connection with the accompanying drawings.

DETAILED DESCRIPTION

Figure 1:
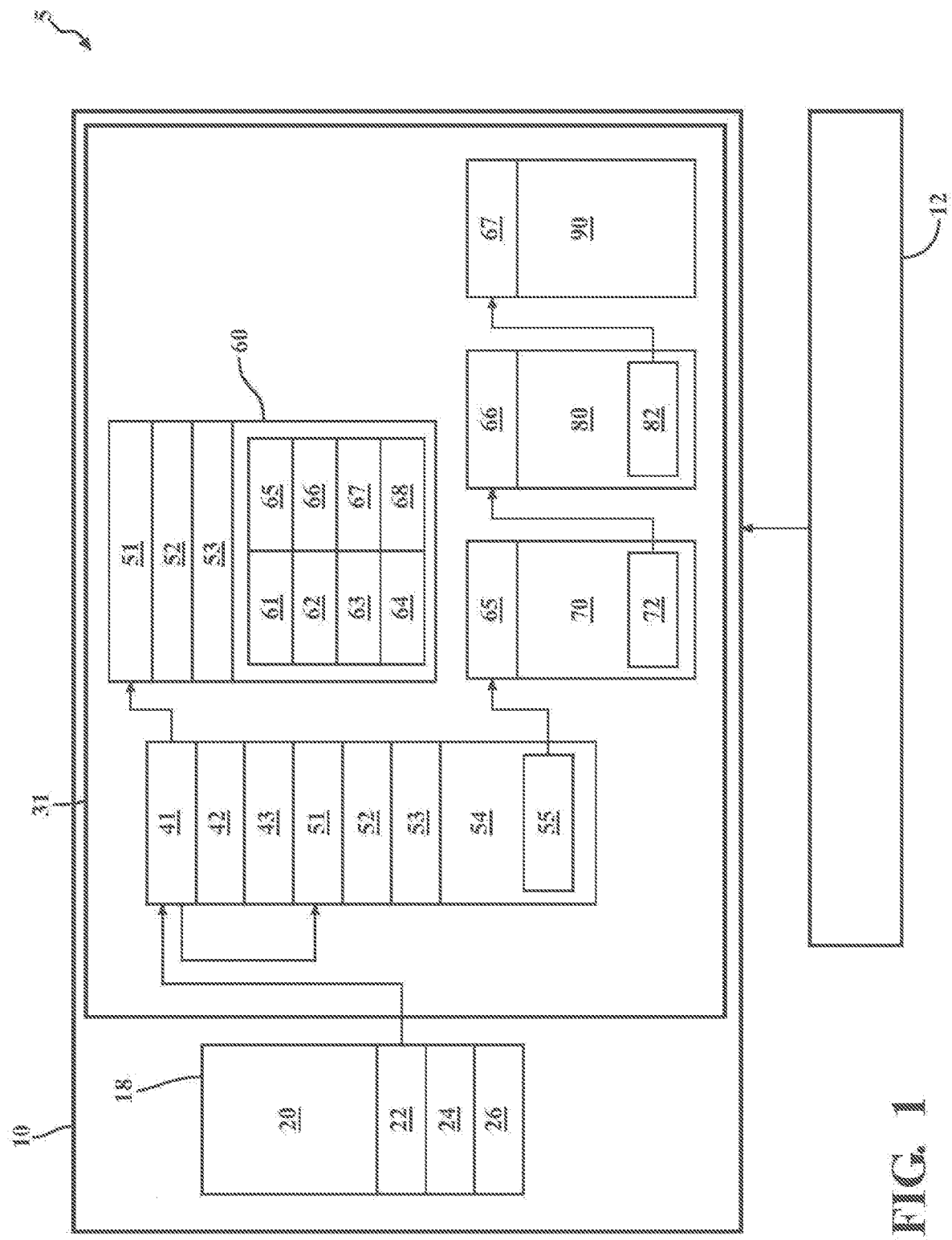
FIG. 1 schematically illustrates an exemplary circuit board including an SoC wherein one of a plurality of candidate firmware image authentication key sets is selected as an active firmware image authentication key set by the primary bootloader utilizing one-time programmable memory, such as electronic fuses, within the SoC, in accordance with the present disclosure.

A computerized control system may be utilized to operate a vehicle, an airplane, a boat, a power generating system, or other similar systems. The computerized control system may include an SoC installed to a circuit board useful to execute functions of the computerized control system. An SoC may include one-time programmable memory which may be utilized to store and operate fixed or immutable programming and data. The one-time programmable memory may include read-only memory (ROM), programmable electronic fuses, and any other type of one-time programmable memory. An SoC may further include random-access memory (RAM), into which programming and data may be loaded and operated during each operational use of the computerized control system. Programs or firmware images may be updated externally, for example, through an external flash program.

An SoC may operate a primary bootloader useful to operate boot events including reset events and power on events. During a boot event, the primary bootloader may establish validity or authenticity of firmware images stored upon the SoC to establish that no counterfeit, hacked, or malicious firmware is present within the SoC.

The primary bootloader may utilize a stored public key to perform authentication of stored images. The present system and method include firmware image authentication within an SoC. The SoC will authenticate its own firmware using the immutable primary bootloader as the root of trust. This root of trust, through iterative authentication processes, is expanded to each authenticated image within the SoC until the SoC is securely booted and contents of the SoC are verified. If the authenticity of an image within the SoC is denied, remedial measures may be taken such as ceasing the boot event or isolating the SoC from a rest of the computerized control system.

A manufacturer of electronic devices or SoCs that participate in firmware image authentication installs or downloads a stored public key to each electronic device or SoC. Key security is important to proper operation of a computerized control system. A first key configured for used in one ecosystem may not be able to be used in a second ecosystem. Ecosystems in which the computerized control system may be configured to operate may be based upon different distinctions. An ecosystem may be based upon a physical region in which the computerized control system will be sold or used. An ecosystem may be based upon which of a plurality of customers or end item manufacturers to which the computerized control system is being delivered. An SoC constructed for customer A with a key configured for use by customer A may not be able to be used with customer B. A device constructed for use in physical region A or country A with a key configured for use within physical region A or country A may not be able to be used in region B or country B.

A system and method are provided wherein a plurality of candidate firmware image authentication key sets for an SoC are distributed, and an active firmware image authentication key set is selected based upon an ecosystem in which the computerized control system is to operate.

The disclosed system and method may include activating a stored public key or deactivating unselected stored public keys in the one-time programmable memory of the SoC. Code stored within the one-time programmable memory of the SoC may include fuses which are configured to correspond with each of the candidate stored keys. Upon determining or selecting an ecosystem in which the computerized control system is to operate, the fuses may be utilized or "tripped" to set which key is to be used to authenticate the firmware images. In the first embodiment, an external flash or a similar event may be utilized to trip the fuses within the primary bootloader and select the active key to be utilized by the primary bootloader from the plurality of candidate stored keys.

The disclosed system and method may include a programming change to a secondary bootloader in RAM of the SoC, for example, with the secondary bootloader being updated or reprogramed through external flash. During a boot event, the primary bootloader communicates with the secondary bootloader as part of a sequence of boot event tasks. The secondary bootloader, once initiated by the primary bootloader, may then perform additional functions during the boot event.

The primary bootloader may be initially provided with a number of public key hashes configured to authenticate corresponding keys and signatures in the secondary bootloader. A public key hash within the SoC one-time programmable memory used by the primary bootloader and a public key and a signature stored within or accessible by the secondary bootloader may collectively be described as a firmware image authentication key set. The SoC may include a plurality of firmware image authentication key sets which may each be a candidate to be selected as an active firmware image authentication key set.

The primary bootloader and the secondary bootloader may each be initially programmed with data corresponding to the plurality of candidate firmware image authentication key sets. The primary bootloader may include programming to utilize one of the public key hashes as a default or initial key for a first boot event and may additionally include programming to activate fuses programmed into the primary bootloader for selection of an active firmware image authentication key set. Firmware images, such as the secondary bootloader, are loaded into SoC RAM from the external flash and authenticated after the initial secure boot event is initiated. Throughout the lifespan of the SoC, the secondary bootloader may utilize one of the keys stored in the SoC corresponding to the active firmware image authentication key set to communicate with the primary bootloader.

The disclosed system and method provide a number of excellent benefits. By providing an ability to create an SoC or a device with a plurality of initially stored key sets and an ability further to select one of the plurality of initially stored key sets for use, the manufacturer of the SoC or device may be able to make one version of the SoC or device which may operate in one of a plurality of ecosystems. The manufacturer may make a same version the SoC for use by company A in country A and alternatively for use by company B in country B.

With reference to the figures, the following table is an index of elements and their reference numerals.

| Element Numeral | Description |
|---|---|
| 5 | circuit board; Electronic Control Unit ("ECU") |
| 10 | System on a Chip ("SoC") |
| 12 | external flash |
| 18 | one-time programmable memory |
| 20 | primary bootloader |
| 22 | public-key hash |
| 24 | public-key hash |
| 26 | public-key hash |
| 31 | Random-Access Memory ("RAM") |
| 41 | public key |
| 42 | public key |
| 43 | public key |
| 51 | signature corresponding to public key 41 |
| 52 | signature corresponding to public key 42 |
| 53 | signature corresponding to public key 43 |
| 54 | secondary bootloader |
| 55 | public key |
| 60 | signature table |
| 61 | address of signature2 65 |
| 62 | address of signature3 66 |
| 63 | address of signature4 67 |
| 64 | address of signature(n) 68 |
| 65 | signature2 |
| 66 | signature3 |
| 67 | signature4 |
| 68 | signature(n); signature 5 |
| 70 | hypervisor module |
| 72 | public key |
| 80 | operating system bootloader module |
| 82 | public key |
| 90 | operating system kernel module |
| 100 | data flow |
| 110 | soft part release application |
| 120 | signing application |
| 130 | firmware image authentication key set module |
| 140 | firmware image authentication key set module |
| 150 | firmware image authentication key set module |

-continued

| Element Numeral | Description |
| --- | --- |
| 160 | signature table |
| 162 | addresses of signatures |
| 170 | data flow |
| 200 | Method for selecting a firmware image authentication key set. |
| 202 | Start the method. |
| 204 | Start manufacturing an SoC. |
| 206 | Manufacture the SoC with a primary bootloader. |
| 208 | Start manufacturing a circuit board or an ECU. |
| 210 | Attach the SoC to the circuit board. Fuse selected public keys into one-time programmable memory. |
| 212 | Initiate a process to perform a secure boot event. |
| 214 | Start installing the circuit board into a larger system. |
| 216 | Fix the active key of the circuit board and invalidate unselected keys. |
| 218 | Potentially replace signatures of images if the active key was changed. |
| 220 | End the method. |
| 300 | device |
| 301 | wireless communication device |
| 310 | central control unit |
| 312 | input port |
| 320 | electric machine |
| 322 | output shaft |

Referring now to the drawings, wherein like reference numbers refer to like features throughout the several views, FIG. 1 schematically illustrates an exemplary circuit board 5 including an SoC 10 wherein one of a plurality of candidate firmware image authentication key sets is selected as an active firmware image authentication key set by utilizing fuses within one-time programmable memory 18, such as fuses, within the SoC 10 and utilized by the primary bootloader 20. The circuit board 5 may be described as an electronic control unit (ECU). The SoC 10 includes the one-time programmable memory 18, with the primary bootloader 20 program stored therewithin. The SoC 10 includes a plurality of public key hashes 22, 24, 26 stored within the one-time programmable memory 18 of the SoC 10 and configured according to a plurality of corresponding candidate firmware image authentication key sets.

The SoC 10 includes RAM memory 31 wherein a firmware image including a secondary bootloader 54 and plurality of public keys 41, 42, 43 are loaded or updated from an external flash 12. The public key hash 22 corresponds to and may be used to confirm authenticity of the public key 41. The public key hash 24 corresponds to and may be used to confirm authenticity of the public key 42. The public key hash 26 corresponds to and may be used to confirm authenticity of the public key 43. The firmware image stored in the RAM memory 31 additionally includes a signature table 60, where for each public key 41, 42, 43, a corresponding signature 51, 52, 53 may be accessed and stored in the RAM memory 31. Additionally, a signature2 65, a signature3 66, a signature4 67, and a signature(n) 68 may be accessed at respective addresses 61, 62, 63, 64 useful to continue the boot event and firmware image authentication process within a hypervisor module 70, an operating system bootloader module 80, an operating system kernel module 90, and other subsequent modules. The signature2 65, signature3 66, signature4 67, and signature(n) 68 may be described as signatures configured for enabling the secondary bootloader to continue subsequent processes of a boot event. The signature2 65, signature3 66, signature4 67, and signature(n) 68 may be firmware image authentication key set specific, with different values for each of the signatures 65, 66, 67, 68 being stored for each firmware image authentication key set.

The primary bootloader 20 may be programmed with an initial key selection, for example, including a first public key hash 22 stored in the one-time programmable memory 18 as a factory setting. This initial key selection may be made for a purpose of enabling a first-time start-up of the circuit board 5, such that an active firmware image authentication key set may be selected after that first start-up. The external flash 12 may be utilized to provide input to the circuit board 5. The primary bootloader 20 may authenticate an image in the external flash 12.

The active firmware image authentication key set may be selected based upon a number of factors, such as in which ecosystem the circuit board 5 is going to operate. In the embodiment of FIG. 1, the public key hash 22 is selected as the active public key hash. In other embodiments, the public key hash 24 or the public key hash 26 may be selected as the active key. The ecosystem may be described or defined by a country in which the circuit board 5 is going to operate or be sold or by a company to which the circuit board 5 is going to be sold. Based upon which of the public key hashes 22, 24, 26 is selected as the active key, the remaining unselected keys may be revoked, deactivated, or erased. In one embodiment, the secondary bootloader 54 is provided as a firmware image by an external flash 12 for downloading to the RAM memory 31 of the SoC 10. Based upon which of the public key hashes 22, 24, 26 is selected as the active key, during a boot event, the primary bootloader 20 authenticates the secondary bootloader 54 stored in the external flash 12. It does this by verifying the signature of the secondary bootloader 54 using the active public key.

Once the primary bootloader 20 has verified authenticity of the secondary bootloader 54, the secondary bootloader 54 may now be trusted and utilized to further advance or execute tasks of the boot event. The secondary bootloader 54 may utilize a stored public key 55 to verify a stored copy of the signature2 65 in a hypervisor module 70 as compared to the signature2 65 of the signature table 60. Upon verifying the stored copy of the signature2 65 within the hypervisor module 70, the secondary bootloader 54 may allow the hypervisor module 70 to execute programming as trusted firmware.

The hypervisor module 70 may utilize a stored public key 72 to verify a stored copy of signature3 66 stored within an operating system bootloader module 80 as compared to the signature3 66 of the signature table 60. Upon verifying the stored copy of the signature3 66, the hypervisor module 70 may allow the operating system bootloader module 80 to execute programming as trusted firmware.

The operating system bootloader module 80 may utilize a stored public key 82 to verify a stored copy of signature4 67 stored within an operating system bootloader module 90 as compared to the signature4 67 of the signature table 60. Upon verifying the stored copy of the signature4 67, the operating system bootloader module 80 may allow the operating system kernel module 90 to execute programming as trusted firmware. The hypervisor module 70, the operating system bootloader module 80, and the operating system kernel module 90 are non-limiting examples of modules which may be authenticated and utilized within a boot event.

The SoC 10 includes three exemplary stored public key hashes 22, 24, 26, one of which is selected as the active key corresponding to an active firmware image authentication key set. The active public key hash of the public key hashes 22, 24, 26 is selected based upon programming of fuses and other type of one-time programmable memory accessed by the primary bootloader 20 within the one-time programmable memory 18. After selection of the active key of the public key hashes 22, 24, 26, this selection is cascaded through the secondary bootloader 54 as a corresponding active key of the public keys 41, 42, 43 is selected and an appropriate signature of the signatures 51, 52, 53 is selected. The respective first, second, and third of each of the public key hashes 22, 24, 26, the public keys 41, 42, 43, and the signatures 51, 52, 53 may be described as candidate firmware image authentication key sets which may be selected from based upon an ecosystem in which the circuit board 5 is to be operated or sold. The selected active public key hash of the public key hashes 22, 24, 26; the selected active public key of the public keys 41, 42, 43; and the appropriate signature of the signatures 51, 52, 53 are utilized throughout a lifespan of the circuit board 5. The three exemplary keys sets of FIG. 1 are exemplary. The SoC 10 may select between two, three, four, or more candidate firmware image authentication key sets.

The active firmware image authentication key set is changed by setting fuses or other type of one-time programmable memory associated with the public key hashes 22, 24, 26. The public keys 41, 42, 43 may be loaded or be provided by the external flash 12. The fuse settings determine which of the plurality of candidate firmware image authentication key sets is selected as the active firmware image authentication key set.

Figure 2:
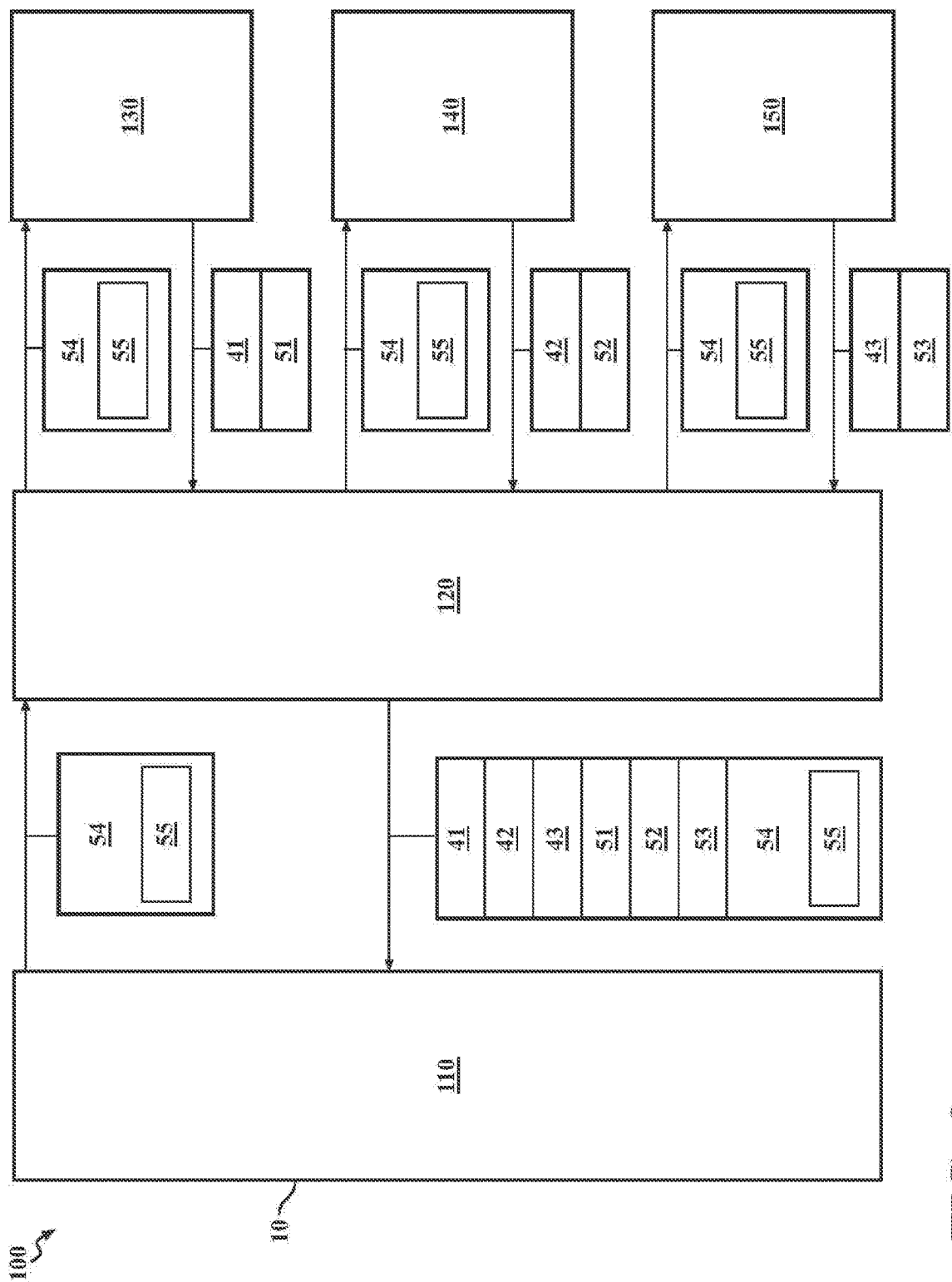
FIG. 2 schematically illustrates a data flow wherein initially loaded images (e.g., the secondary bootloader) to be signed for secure boot are signed by each of a plurality of firmware image authentication key sets modules in preparation for an initial boot event, in accordance with the present disclosure.

FIG. 2 schematically illustrates a data flow 100 wherein initially loaded images (e.g., the secondary bootloader 54) to be signed for secure boot are signed by each of a plurality of firmware image authentication key sets modules 130, 140, 150 in preparation for an initial boot event. A soft part release application 110 is illustrated as programming stored in the RAM memory 31. The soft part release application 110 includes an initial unsigned version of the secondary bootloader 54 including the public key 55. A signing application 120 is illustrated receiving the unsigned secondary bootloader 54 from the soft part release application 110. The signing application 120 distributes the unsigned secondary bootloader 54 to each of the firmware image authentication key sets modules 130, 140, 150. The firmware image authentication key sets module 130 provides the public key 41 and the signature 51 associated with a first firmware image authentication key set. The firmware image authentication key sets module 140 provides the public key 42 and the signature 52 associated with a second firmware image authentication key set. The firmware image authentication key sets module 150 provides the public key 43 and the signature 53 associated with a third firmware image authentication key set.

The signing application 120 appends the public keys 41, 42, 43 and the signatures 51, 52, 53 to the secondary bootloader 54. The signing application 120 may additionally append a certification chain to the secondary bootloader 54. The signing application 120 transforms the unsigned secondary bootloader 54 into a signed secondary bootloader 54 and transfers that signed secondary bootloader 54 to the soft part release application 110 for use in an initial boot event.

Figure 3:
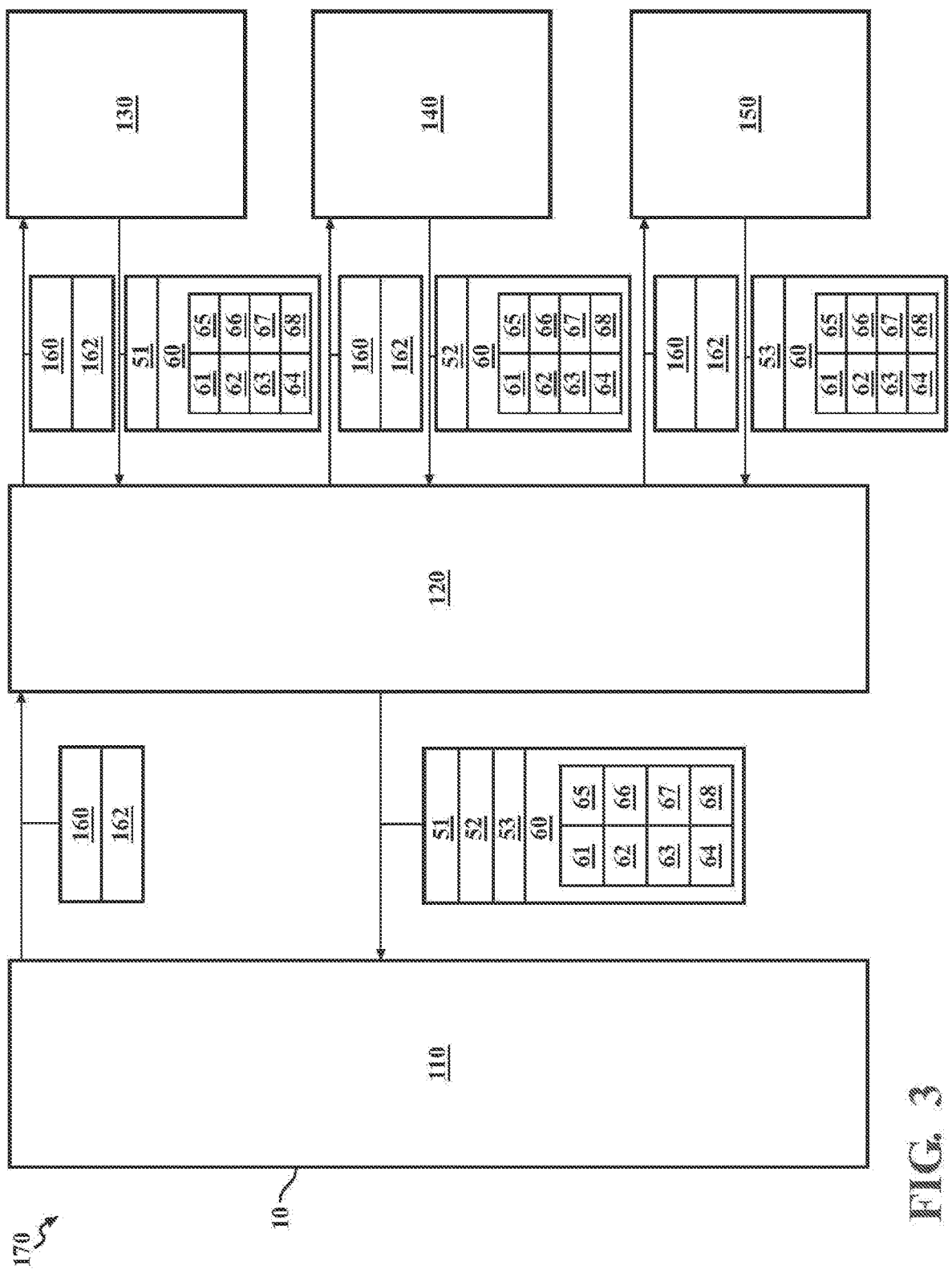
FIG. 3 schematically illustrates a data flow wherein the signature table of FIG. 1 to be utilized by the secondary bootloader is created by utilizing addresses where signatures are stored and addresses where signatures are stored, in accordance with the present disclosure.

FIG. 3 schematically illustrates a data flow 170 wherein the signature table 160 of FIG. 1 to be utilized by the secondary bootloader 54 is created by utilizing addresses where signatures 51, 52, 53 are stored and addresses 61, 62, 63, 64 where signatures 65, 66, 67, 68 are stored. The data flow 170 includes the soft part release application 110, the signing application 120, and the firmware image authentication key set modules 130, 140, 150 of FIG. 3. The soft part release application 110 includes a signature table 160 to be single signed for secure boot. The soft part release application 110 further includes addresses 162 of signatures 51, 52, 53, 65, 66, 67, 68. The signing application 120 receives the images 160 and the addresses 162 and provides the images 160 and the addresses 162 to each of the firmware image authentication key set modules 130, 140, 150.

The firmware image authentication key set module 130 receives the images 160 and the addresses 162 and provides a signature 51 and PKI-authentication-key-set-specific values of the signature2 65, the signature3 66, the signature4 67, and the signature 5 68 for populating a signature table 60 including the addresses 61, 62, 63, 64 and the corresponding signature2 65, the corresponding signature3 66, the corresponding signature4 67, and the corresponding signature 5 68.

The firmware image authentication key set module 140 receives the images 160 and the addresses 162 and provides a signature 52 and PKI-authentication-key-set-specific values of the signature2 65, the signature3 66, the signature4 67, and the signature 5 68 for populating a signature table 60 including the addresses 61, 62, 63, 64 and the corresponding signature2 65, the corresponding signature3 66, the corresponding signature4 67, and the corresponding signature 5 68.

The firmware image authentication key set module 150 receives the images 160 and the addresses 162 and provides a signature 53 and PKI-authentication-key-set-specific values of the signature2 65, the signature3 66, the signature4 67, and the signature 5 68 for populating a signature table 60 including the addresses 61, 62, 63, 64 and the corresponding signature2 65, the corresponding signature3 66, the corresponding signature4 67, and the corresponding signature 5 68.

The signing application 120 appends the signatures 51, 52, 53, the addresses 61, 62, 63, 64, and the corresponding signature2 65, the corresponding signature3 66, the corresponding signature4 67, and the corresponding signature 5 68 to the signature table 60. The signing application 120 provides images and addresses to each of the firmware image authentication key set modules 130, 140, 150, collects data, and provides to the soft part release application 110 the authentication table 60 including all of the populated values of the authentication table 60.

Figure 4:
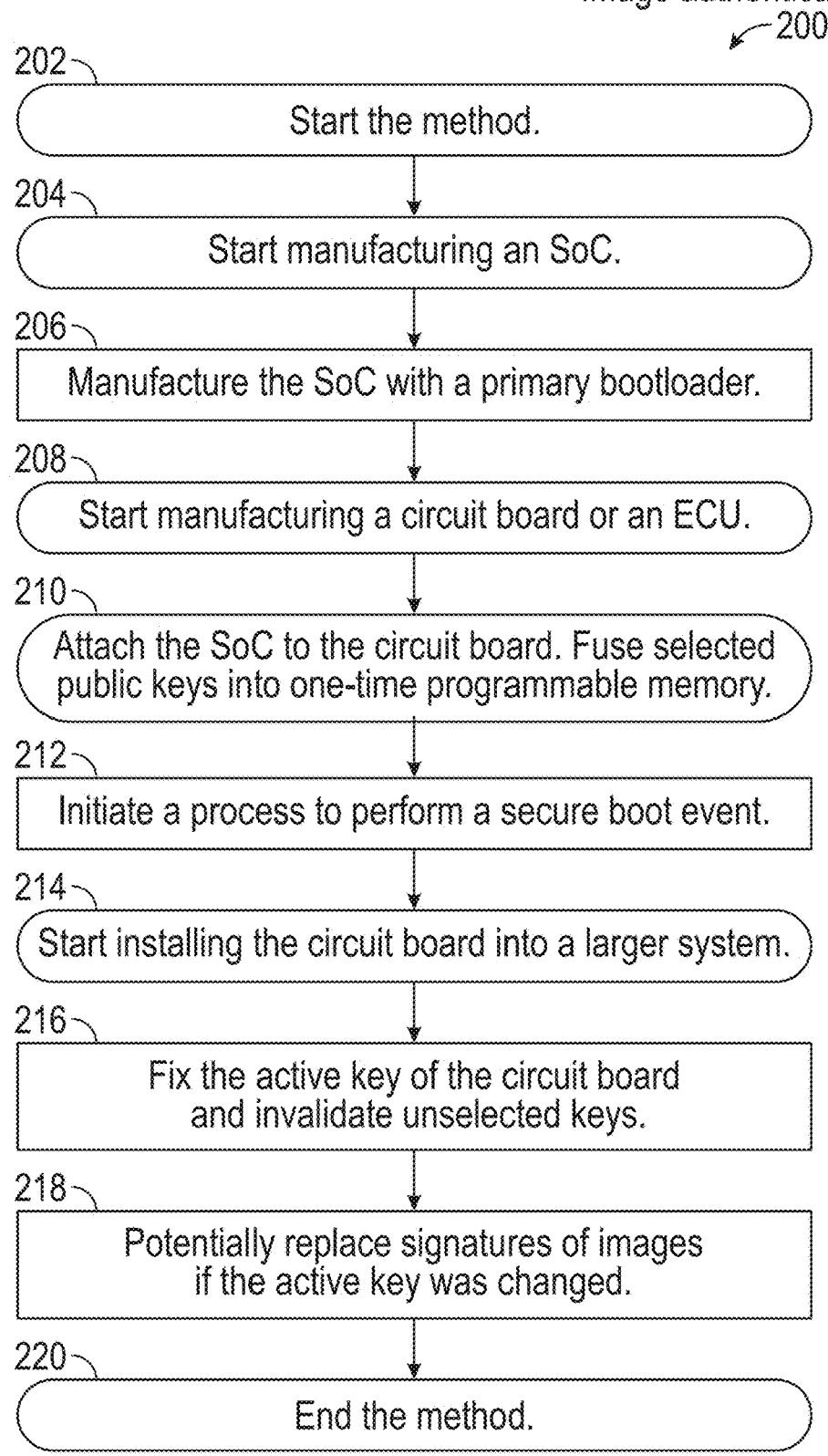
FIG. 4 is a flowchart illustrating a method for creating and selecting an active firmware image authentication key set within the circuit board of FIG. 1, in accordance with the present disclosure.

FIG. 4 is a flowchart illustrating a method 200 for creating and selecting an active firmware image authentication key set within the circuit board 5 of FIG. 1. The method 200 refers to physical components of the circuit board 5 of FIG. 1, although alternative components may be utilized in accordance with the method 200. The method 200 starts at step 202. At step 204, a portion of the method 200 wherein the SoC 10 is manufactured starts. At step 206, the SoC 10 is manufactured and initially programmed with the primary bootloader 20. The SoC 10 includes one-time programmable memory 18, and the primary bootloader 20 is stored in the one-time programmable memory 18. A plurality of public key hashes 22, 24, 26 are additionally stored in the one-time programmable memory 18 of the SoC 10. The public key hashes 22, 24, 26 each correspond to one of a plurality of candidate firmware image authentication key sets. One of the public key hashes 22, 24, 26 is selected as an initially active key that may be utilized to authenticate firmware within the SoC 10. At step 208, a portion of the method 200 wherein the circuit board 5 or the ECU is manufactured starts. At step 210, the SoC 10 is attached to the circuit board 5 and public keys from the plurality of candidate firmware image authentication key sets are fused in the one-time programmable memory 18 of the SoC 10. At step 212, the initially active key of the public key hashes 22, 24, 26 within the SoC 10 is utilized to initiate a process to perform a secure boot event. This secure boot event may be described to establish a default root of trust (RoT) from the primary bootloader 20 to the secondary bootloader 54. As part of this secure boot event, an active firmware image authentication key set may be selected through the programmed fuses of the primary bootloader 20, thereby designating as active a corresponding one of the public key hashes 22, 24, 26. At step 214, a portion of the method 200 wherein the circuit board 5 is installed to a larger system such as a vehicle is started. At step 216, the active key to be utilized throughout a lifespan of the circuit board 5 is fixed and the unselected keys are set to invalid. At step 218, the signature on images such as the secondary bootloader 54 which are authenticated by the primary bootloader 20 may be replaced, if the active key was changed between the initial secure boot event and installation in the larger system. The circuit board 5 may be utilized through subsequent boot events, with the active firmware image authentication key set being utilized to provide secure boot events. At step 220, the method 200 ends. A number of additional and/or alternative method steps are envisioned, and the disclosure is not intended to be limited to the examples provided herein.

Figure 5:
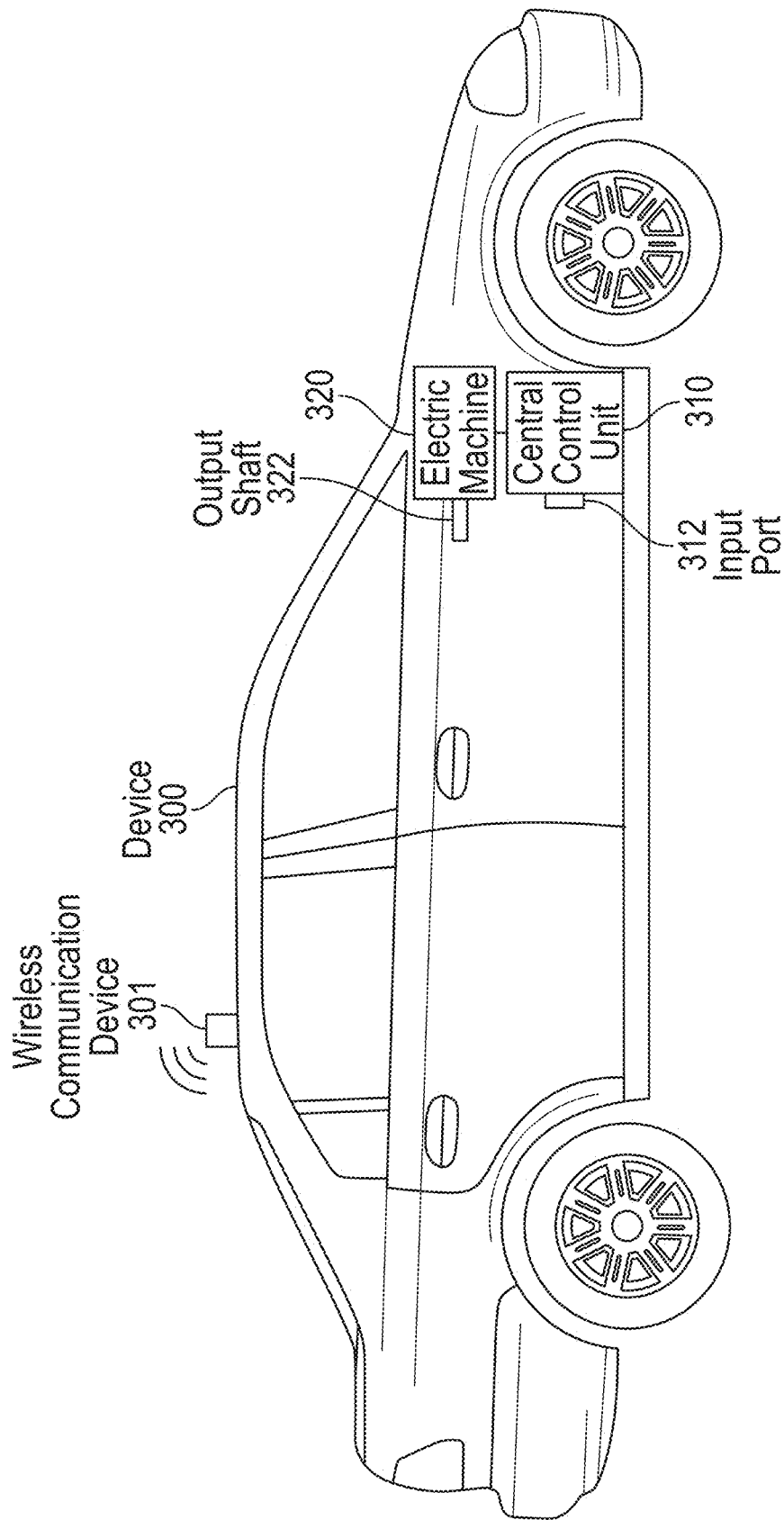
FIG. 5 schematically illustrates an exemplary device including a central control unit including the circuit board of FIG. 1, in accordance with the present disclosure.

FIG. 5 schematically illustrates an exemplary device 300 including a central control unit 310 including the circuit board 5 of FIG. 1. In the embodiment of FIG. 5, the device 300 includes a vehicle. In other embodiments, the device 300 may be a power generation system, a boat, an airplane, or another device utilizing a computerized control system including the circuit board 5. The device 300 includes a wireless communication device 301, the central control unit 310, and an electric machine 320. The electric machine 320 includes an output shaft 322 configured to provide a useful output torque. The central control unit 310 is illustrated including an optional input port 312. The external flash 12 may connect to and provide programming or data to the central control unit 310 and the circuit board 5 thereof through either the wireless communication device 301, for example, by wireless communications to a remote server device, or through the input port 312.

While the best modes for carrying out the disclosure have been described in detail, those familiar with the art to which this disclosure relates will recognize various alternative designs and embodiments for practicing the disclosure within the scope of the appended claims.

What is claimed is:

1. A system for implementing a secure boot event, comprising:
    a circuit board including:
        a system on a chip (SoC) including:
            one-time programmable memory configured for storing computerized programming;
            a plurality of public key hashes stored within the one-time programmable memory, wherein each of the plurality of public key hashes is configured for use with one of a plurality of candidate firmware image authentication key sets;
            random-access memory (RAM) configured for storing a firmware image;
            the firmware image configured for being executed by the SoC and stored within the RAM including:
                a secondary bootloader;
                a plurality of public keys, wherein each of the plurality of public keys is configured for use with one of the plurality of candidate firmware image authentication key sets; and
                a plurality of signatures stored, wherein each of the plurality of signatures is configured for use with one of the plurality of candidate firmware image authentication key sets; and
            a primary bootloader stored within the one-time programmable memory and utilizing a plurality of fuses configured for selectively activating a selected public key hash from the plurality of public key hashes; and
    wherein the selected public key hash is selected based upon an ecosystem in which the system is to operate;
    wherein the ecosystem in which the system is to operate includes a geographic region in which the system is to operate;
    wherein the selected public key hash is utilized to select an active public key from the plurality of public keys;
    wherein the selected public key hash is utilized to select an active signature from the plurality of signatures;
    wherein the selected public key hash, the active public key, and the active signature define an active firmware image authentication key set from the plurality of candidate firmware image authentication key sets;
    wherein the SoC is configured for executing an update to the firmware image through an external flash; and
    wherein, during the secure boot event, the primary bootloader utilizes the active firmware image authentication key set to authenticate the firmware image.

2. The system of claim 1, wherein the ecosystem in which the system is to operate includes a company to which the system is being sold.

3. The system if claim 1, wherein one of the public key hashes is selected as an initially active public key hash; and
    wherein, during an initial secure boot event, the initially active public key hash and a corresponding one of the plurality of public keys are used to establish a default root of trust between the primary bootloader and the secondary bootloader.

4. The system of claim 3, wherein, after the selected public key hash is selected from the plurality of public key hashes, a remainder of the plurality of public key hashes are revoked.

5. The system of claim 1, wherein the firmware image further includes a signature table including a second plurality of signatures, wherein the second plurality of signatures is configured for authenticating one of a hypervisor module, an operating system bootloader module, or an operating system kernel module.

6. A system for implementing a secure boot event, comprising:
    a device including a circuit board including:
        a system on a chip (SoC) including:
            one-time programmable memory configured for storing computerized programming;
            a plurality of public key hashes stored within the one-time programmable memory, wherein each of the plurality of public key hashes is configured for use with one of a plurality of candidate firmware image authentication key sets;
            random-access memory (RAM) configured for storing a firmware image;
            the firmware image configured for being executed by the SoC and stored within the RAM including:
                a secondary bootloader;
                a plurality of public keys, wherein each of the plurality of public keys is configured for use with one of the plurality of candidate firmware image authentication key sets; and
a plurality of signatures, wherein each of the plurality of signatures is configured for use with one of the plurality of candidate firmware image authentication key sets; and
a primary bootloader stored within the one-time programmable memory and utilizing a plurality of fuses configured for selectively activating a selected public key hash from the plurality of public key hashes; and
wherein the selected public key hash is selected based upon an ecosystem in which the system is to operate;
wherein the ecosystem in which the system is to operate includes a geographic region in which the system is to operate;
wherein the selected public key hash is utilized to select an active public key from the plurality of public keys;
wherein the selected public key hash is utilized to select an active signature from the plurality of signatures;
wherein the selected public key hash, the active public key, and the active signature define an active firmware image authentication key set from the plurality of candidate firmware image authentication key sets;
wherein the SoC is configured for executing an update to the firmware image through an external flash; and
wherein, during the secure boot event, the primary bootloader utilizes the active firmware image authentication key set to authenticate the firmware image.

7. The system of claim 6, wherein the device includes a vehicle.

8. The system of claim 6, wherein the ecosystem in which the system is to operate includes a company to which the system is being sold.

9. The system if claim 6, wherein one of the public key hashes is selected as an initially active public key hash; and
wherein, during an initial secure boot event, the initially active public key hash and a corresponding one of the plurality of public keys are used to establish a default root of trust between the primary bootloader and the secondary bootloader.

10. The system of claim 9, wherein, after the selected public key hash is selected from the plurality of public key hashes, a remainder of the plurality of public key hashes are revoked.

11. The system of claim 6, wherein the firmware image further includes a signature table including a second plurality of signatures, wherein the second plurality of signatures is configured for authenticating one of a hypervisor module, an operating system bootloader module, or an operating system kernel module.

12. A method for implementing a secure boot event, the method comprising:
within one-time programmable memory of a system on a chip (SoC), storing a plurality of public key hashes within the one-time programmable memory, wherein each of the plurality of public key hashes is configured for use with one of a plurality of candidate firmware image authentication key sets;
within random-access memory (RAM) of the SoC, storing a firmware image, wherein the firmware image is configured for being executed by the SoC and includes:
a secondary bootloader;
a plurality of public keys, wherein each of the plurality of public keys is configured for use with one of the plurality of candidate firmware image authentication key sets; and
a plurality of signatures, wherein each of the plurality of signatures is configured for use with one of the plurality of candidate firmware image authentication key sets;
within the one-time programmable memory, additionally storing a primary bootloader utilizing a plurality of fuses within the SoC configured for selectively activating a selected public key hash from the plurality of public key hashes;
activating the selected public key hash based upon an ecosystem in which the system is to operate;
wherein the ecosystem in which the system is to operate includes a geographic region in which the system is to operate;
utilizing the selected public key hash to select an active public key from the plurality of public keys;
utilizing the selected public key hash to select an active signature from the plurality of signatures;
defining an active firmware image authentication key set from the plurality of candidate firmware image authentication key sets based upon the selected public key hash, the active public key, and the active signature define;
executing an update to the firmware image through an external flash; and
during the secure boot event, operating the primary bootloader to utilize the active firmware image authentication key set to authenticate the firmware image.

13. The method of claim 12, wherein the ecosystem in which the system is to operate includes a company to which the system is being sold.

14. The method of claim 12, further comprising:
selecting one of the plurality of public key hashes as an initially active public key hash; and
during an initial secure boot event, utilizing the initially active public key hash and a corresponding one of the plurality of public keys to establish a default root of trust between the primary bootloader and the secondary bootloader.

15. The method of claim 14, further comprising, after the selected public key hash is selected from the plurality of public key hashes, revoking a remainder of the plurality of public key hashes.

16. The method of claim 14, wherein the firmware image further includes a signature table including a second plurality of signatures; and
further comprising utilizing the second plurality of signatures to authenticate one of a hypervisor module, an operating system bootloader module, or an operating system kernel module.

* * * * *